United States Patent
Stavova et al.

(10) Patent No.: US 11,648,503 B2
(45) Date of Patent: May 16, 2023

(54) SCRUBBER APPARATUS FOR CARBON DIOXIDE REMOVAL AND CONTROLLED ATMOSPHERE OPERATING METHOD

(71) Applicant: THERMO KING LLC, Minneapolis, MN (US)

(72) Inventors: Petra Stavova, Beroun (CZ); Martin Vojik, Prague (CZ); Miguel Angel Ferrer Blas, Barcelona (ES); Tomas Kohoutek, Cerveny Ujezd (CZ); Michal Kolda, Prague (CZ)

(73) Assignee: THERMO KING LLC, Minneapolis, MN (US)

( * ) Notice: Subject to any disclaimer, the term of this patent is extended or adjusted under 35 U.S.C. 154(b) by 143 days.

(21) Appl. No.: 17/332,660

(22) Filed: May 27, 2021

(65) Prior Publication Data

US 2021/0370221 A1   Dec. 2, 2021

(30) Foreign Application Priority Data

Jun. 2, 2020   (EP) .................................... 20382472

(51) Int. Cl.
*B01D 53/04* (2006.01)

(52) U.S. Cl.
CPC ..... *B01D 53/0438* (2013.01); *B01D 53/0446* (2013.01); *B01D 53/0454* (2013.01);
(Continued)

(58) Field of Classification Search
CPC ........... A23B 7/04; A23B 7/148; Y02C 20/40; B01D 53/04; B01D 53/0438;
(Continued)

(56) References Cited

U.S. PATENT DOCUMENTS 10,086,324 B2 * 10/2018 Meirav .................... F24F 3/16
10,675,582 B2 *  6/2020 Meirav ............. B01D 53/0438
(Continued)

FOREIGN PATENT DOCUMENTS

EP       2734284 B1 *  9/2019  ............. A23B 7/148
EP       3574764       12/2019
(Continued)

OTHER PUBLICATIONS

Extended European Search Report, issued in the corresponding EP patent application No. 20382472.7, dated Nov. 25, 2020, 10 pages.

*Primary Examiner* — Frank M Lawrence, Jr.
(74) *Attorney, Agent, or Firm* — Hamre, Schumann, Mueller & Larson, P.C.

(57) ABSTRACT

The disclosure relates to an activated carbon scrubber apparatus 300 and a method of its operation for carbon dioxide ($CO_2$) removal from a controlled environment. The scrubber apparatus is configured to switch between: an adsorption configuration in which it is configured to provide $CO_2$-rich gas from the controlled environment to a sorbent bed 302 comprising activated carbon for $CO_2$ adsorption, and to return the treated gas to the controlled environment; and a regeneration configuration in which it is configured to provide a regenerating gas from outside of the controlled environment to the sorbent bed to desorb $CO_2$ and regenerate the activated carbon, and to discharge $CO_2$-rich gas outside of the controlled environment. The method comprises alternately operating the scrubber apparatus in the adsorption configuration and the regeneration configuration over a plurality of cycles, wherein the scrubber apparatus is operated at a cycle frequency of between 4 and 30 cycles per hour. A heater 303 is controlled to heat the sorbent bed in the regeneration configuration.

20 Claims, 5 Drawing Sheets

(52) U.S. Cl.
CPC .. *B01D 2253/102* (2013.01); *B01D 2257/504* (2013.01); *B01D 2259/40086* (2013.01); *B01D 2259/40096* (2013.01); *B01D 2259/4525* (2013.01); *B01D 2259/4566* (2013.01)

(58) Field of Classification Search
CPC ............ B01D 53/0446; B01D 53/0454; B01D 53/0462; B01D 53/10; B01D 2253/102; B01D 2257/504; B01D 2257/2259; B01D 2257/40007; B01D 2257/40086; B01D 2257/40088; B01D 2257/40096; B01D 2257/401; B01D 2257/4525; B01D 2257/4566
USPC ................ 95/11, 139, 148; 96/111, 126, 146
See application file for complete search history.

(56) References Cited

U.S. PATENT DOCUMENTS

| | | |
|---|---|---|
| 2010/0242728 A1 | 9/2010 | Radosz et al. |
| 2012/0325086 A1* | 12/2012 | Schaefer ................ A23B 7/148 |
| | | 95/171 |
| 2014/0186255 A1 | 7/2014 | Jadhav |
| 2018/0236396 A1* | 8/2018 | Meirav ..................... F24F 8/10 |

FOREIGN PATENT DOCUMENTS

| | | |
|---|---|---|
| EP | 3574976 | 12/2019 |
| WO | 2013/012623 | 1/2013 |
| WO | 2016/108952 | 7/2016 |
| WO | 2019/092128 | 5/2019 |

* cited by examiner

SCRUBBER APPARATUS FOR CARBON DIOXIDE REMOVAL AND CONTROLLED ATMOSPHERE OPERATING METHOD

TECHNICAL FIELD

The invention relates to an activated carbon scrubber apparatus for carbon dioxide (CO2) removal from a controlled environment, and a method of operating a scrubber apparatus for controlled atmosphere applications. Particularly, though not exclusively, the invention relates to such scrubber apparatuses and methods for use with transport refrigeration systems, such as for refrigerated trucks, and sea-going containers.

BACKGROUND

Controlled atmosphere is a term of the art used to indicate the control of a gas mixture within an enclosed space. Controlled atmosphere is particularly relevant for the transport of produce, such as fruits and vegetables. For example, it may be desirable to control relative proportions of carbon dioxide, oxygen and other constituent gases within an environment in which produce is stored. The term "controlled atmosphere" is used herein to indicate the category of product (i.e. products which are configured to control the gas mixture in an enclosed space), whereas the expression "a controlled environment" is used to refer to the gas volume within such an enclosed space itself.

It is known to remove carbon dioxide from a controlled atmosphere using a regenerative scrubber apparatus. Typical sorbents for use with such systems include zeolite (aluminosilicate minerals), such as zeolite 13x.

It is known to provide activated carbon in gas filtering and control systems, particularly for use to remove volatile organic compounds. However, it has not been considered to present a practical solution for regenerative adsorption owing to its relatively low adsorption efficiency and high temperature regeneration process.

SUMMARY

According to a first aspect of the disclosure there is provided a method of operating an activated carbon scrubber apparatus for carbon dioxide ($CO_2$) removal from a controlled environment;
wherein the scrubber apparatus is configured to switch between:
an adsorption configuration in which it is configured to provide $CO_2$-rich gas from the controlled environment to a sorbent bed comprising activated carbon for $CO_2$ adsorption, and to return the treated gas to the controlled environment;
a regeneration configuration in which it is configured to provide a regenerating gas from outside of the controlled environment to the sorbent bed to desorb $CO_2$ and regenerate the activated carbon, and to discharge $CO_2$-rich gas outside of the controlled environment;
the method comprising:
alternately operating the scrubber apparatus in the adsorption configuration and the regeneration configuration over a plurality of cycles, each cycle comprising a single period in the adsorption configuration and a single period in the regeneration configuration;
wherein the scrubber apparatus is operated at a cycle frequency of between 4 and 50 cycles per hour, for example between 4 and 30 cycles per hour;
controlling a heater to heat the sorbent bed in the regeneration configuration.

The sorbent bed may be heated by directly heating the regenerating gas upstream of the sorbent bed, so as to indirectly heat the sorbent bed. The sorbent bed may be directly heated by transferring heat from a heat transfer element to the sorbent bed. For example, the heat transfer element may be heated element of an electrical heater, or may be a heat exchange element of a heat pump.

The sorbent bed may comprise predominantly activated carbon. For example, it may be no less than 70 wt. % activated carbon, or no less than 80 wt. %, or no less than 90 wt. %, or no less than 95 wt. %, or no less than 99 wt. % of the sorbent bed is activated carbon. The sorbent bed may consist of activated carbon.

The cycle frequency may be between 10 and 20 cycles per hour.

For each cycle, the scrubber apparatus may be operated at a cycle ratio, defined as the ratio between the period in the adsorption configuration and the period in the regeneration configuration, of between 1:1 and 5:1. The cycle ratio may be between 2:1 and 4:1.

For each cycle, the scrubber apparatus may be operated in the regeneration configuration for at least 45 seconds, for example 1 minute or more.

During each cycle, the sorbent bed may be heated to a maximum average temperature of no more than 75° C., for example no more than 50° C., no more than 40° C., or no more than 30° C. The maximum average temperature may be no less than 15° C., for example no less than 20° C.

The expression "maximum average temperature" relates to the highest average temperature to which the sorbent bed is heated. Therefore, it is not a temperature limit beyond which the bed is not heated, but instead is the actual highest average temperature to which it is heated during the cycle (with heating being done during operation in the regeneration configuration, such that the highest average temperature is generally reached at the end of the period in the regeneration configuration).

During each cycle, the heating may be such that the discharged $CO_2$-rich gas has a maximum temperature as it is discharged from the sorbent bed of no more than 75° C., for example no more than 50° C., no more than 40° C., or no more than 30° C. During each cycle, the heating may be such that the discharged $CO_2$-rich gas has a maximum temperature as it is discharged from the sorbent bed of no less than 15°, for example no less than 20° C.

The heater may be controlled to transfer heat to the sorbent bed during the regeneration configuration at a maximum specific heat transfer rate, relative to the weight of sorbent material in the sorbent bed, of no more than 5 kW/kg, for example no more than 3 kW/kg.

The scrubber apparatus may be operated so that a volumetric flow rate of gas through the sorbent bed is higher during operation in the regeneration configuration than during operation in the adsorption configuration.

The volumetric flow rate may be at least 50% greater during operation in the regeneration configuration than during operation in the adsorption configuration.

The sorbent bed may be configured so that the average flow velocity through the sorbent bed is less than 0.5 m/s in the adsorption configuration, and greater than 0.5 m/s in the regeneration configuration.

It may be that the cycle ratio is variable. A controller may cause the cycle ratio to vary between a relatively lower ratio and a relatively higher ratio responsive to determining a low power condition and a high power condition, respectively, of a controlled atmosphere system in which the scrubber apparatus is installed. It may be that the low power condition corresponds to power being supplied to the controlled atmosphere system from a local power supply with no access to shore power, and the high power condition corresponds to power being supplied to the controlled atmosphere system from a shore power supply.

The scrubber apparatus may be installed in a controlled atmosphere system, such as a transport refrigeration system for use in a shipping container, trailer or truck.

The controlled atmosphere system may be operated to regulate a level of carbon dioxide within a controlled environment. The regulation may comprise determining a requirement to reduce the level of carbon dioxide to a threshold or below. Responsive to determining the requirement to reduce the level of carbon dioxide, the scrubber apparatus may be operated (i.e. controlled to operate) in a $CO_2$ reduction mode to remove carbon dioxide from the controlled environment until the carbon dioxide is reduced to the threshold or below. The scrubber apparatus may be alternately operated (i.e. controlled to operate) in the adsorption configuration and the regeneration configuration during operation in the $CO_2$ reduction mode.

Accordingly, despite operating in the $CO_2$ reduction mode, the scrubber apparatus is periodically operated so that it performs no adsorption of carbon dioxide (i.e. in the regeneration configuration). If there are multiple scrubber apparatuses, it may be that each and every scrubber apparatus simultaneously operates in the regeneration configuration during operation in the $CO_2$ reduction mode, such that none of the scrubber apparatuses performs adsorption despite the scrubber apparatuses being operated in the $CO_2$ reduction mode.

The regulation may comprise determining that the level of carbon dioxide is reduced to the threshold or below. The determination may comprise determining that the level of carbon dioxide is within a target range. Responsive to the determination, the scrubber may apparatus may be placed in a standby mode, in which it is deactivated or operated (i.e. controlled to operate) at a relatively lower $CO_2$ removal rate than in the $CO_2$ reduction mode. The scrubber apparatus may be deactivated by turning of the heater and/or the air mover. The scrubber may be placed in the regeneration configuration when deactivated. Even when deactivated and in the regeneration configuration, there may be a passive (i.e. unforced) flow of regenerating gas that may regenerate the sorbent bed.

According to a second aspect there is disclosed a scrubber apparatus for removing carbon dioxide from a controlled environment, the scrubber apparatus comprising:

a sorbent bed comprising activated carbon for $CO_2$ adsorption;

a gas interchange mechanism configured to switch between:
  an adsorption configuration in which the sorbent bed is in fluid communication with a controlled environment inlet to receive $CO_2$-rich gas from a controlled environment for adsorption, and in which the sorbent bed is in fluid communication with a controlled environment outlet to return treated gas to the controlled environment;
  a regeneration configuration in which the sorbent bed is in fluid communication with a regenerating gas inlet to receive regenerating gas from outside of the controlled environment for desorption, and in which the sorbent bed is in fluid communication with an outside outlet to discharge $CO_2$-rich gas outside of the controlled environment;

a heater configured to heat the sorbent bed in the regeneration configuration;

a controller configured to cause the scrubber apparatus to alternately operate in the adsorption configuration and the regeneration configuration over a plurality of cycles, each cycle comprising a single period in the adsorption configuration and a single period in the regeneration configuration;

wherein the controller is configured to cause the scrubber apparatus to be operated at a cycle frequency of between 4 and 30 cycles per hour, for example between 10 and 20 cycles per hour;

wherein the controller is configured to control the heater to heat the sorbent bed in the regeneration configuration.

The scrubber apparatus may comprise one or more air movers for directing gas through the sorbent bed. The controller may be configured to control the one or more air movers so that the volumetric flow rate of gas through the sorbent bed is higher during operation in the regeneration configuration than during operation in the adsorption configuration. The volumetric flow rate may be at least 50% greater during operation in the regeneration configuration than during operation in the adsorption configuration.

The heater may have a maximum specific heat transfer rate for heating the sorbent bed, relative to the weight of sorbent material in the sorbent bed, of no more than 5 kW/kg, for example no more than 3 kW/kg.

The controller may be configured to operate the scrubber apparatus at a cycle ratio, defined as the ratio between the period in the adsorption configuration and the period in the regeneration configuration, of between 1:1 and 5:1, for example between 2:1 and 4:1.

According to a third aspect there is disclosed a controlled atmosphere system, such as a transport refrigeration system, comprising a scrubber apparatus in accordance with the second aspect.

The controlled atmosphere system may be configured to regulate a level of carbon dioxide within a controlled environment, and may be configured to determine a requirement to reduce the level of carbon dioxide to a threshold or below. The controlled atmosphere system may be configured to operate the scrubber apparatus in a $CO_2$ reduction mode responsive to determining the requirement to reduce the level of carbon dioxide. The scrubber apparatus may be configured to operate alternately in the adsorption configuration and the regeneration configuration during operation in the $CO_2$ reduction mode.

The disclosure extends to any combination of the features of the methods and apparatuses described above with respect to the first to third aspects of the disclosure, and elsewhere herein, except such combinations as are mutually exclusive.

BRIEF DESCRIPTION OF THE DRAWINGS

The invention will now be described, by way of example only, with reference to the accompanying drawings, in which.

DETAILED DESCRIPTION

The invention relates to operation of a scrubber apparatus for $CO_2$ removal, wherein the sorbent material of the scrubber apparatus is activated carbon.

By way of example only, the invention will be described with reference to an example of use in a refrigeration module of a refrigerated transport system (in particular a refrigerated transport container). However, it will be appreciated that the disclosure relates primarily to a scrubber apparatus and its method of operation, which are equally applicable in other types of installation and contexts.

Figure 1:
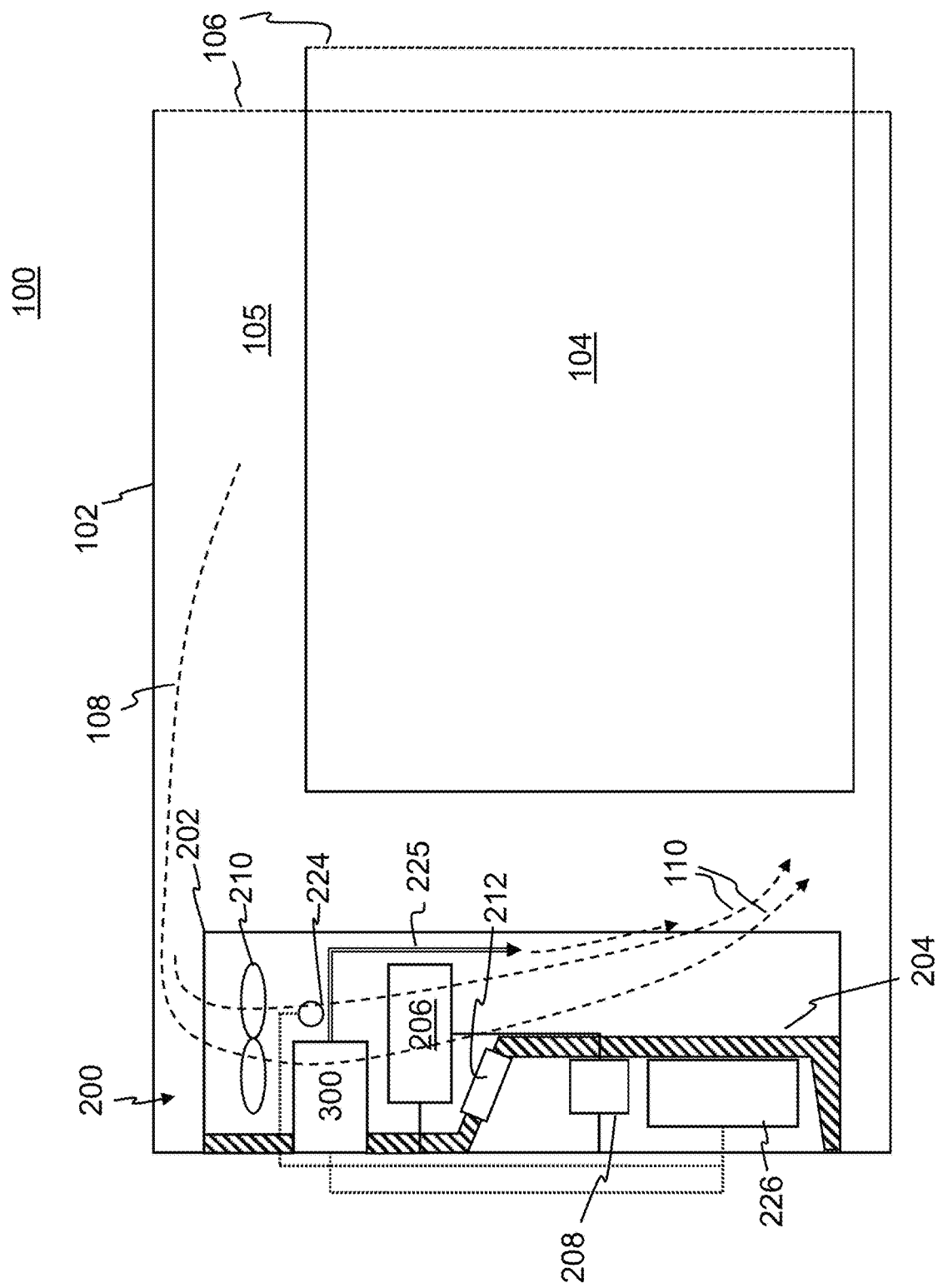
FIG. 1 is a partial schematic cut-away side view of an example refrigerated transport container including a scrubber apparatus.

FIG. 1 schematically shows a transport container 100 comprising external walls 102 which separate an internal controlled environment of interior gas from an external atmosphere of exterior gas. By way of example, cargo 104 is provided in a cargo space 105 of the container, such as a load of fresh fruit and vegetables, and the controlled environment is the volume of gas filling the enclosed cargo space 105. FIG. 1 is a partial view showing a first end of the container which comprises a refrigeration module 200. An end of the container and of the cargo 104 away from the first end of the container is not shown for simplification of the drawing, as indicated by continuation lines 106.

The refrigeration module 200 is installed in the transport container to provide a refrigerated transport container. The refrigeration module 200 is generally provided at one end of the container adjacent to a wall 102 of the transport container 100.

The refrigeration module 200 comprises a structural frame 202 which is within the container when installed in the container 100, and is open so as to permit a flow of return air 108 to be directed to components of the refrigeration module 200 as will be described below, and to deliver a flow of supply air 110 to the cargo space.

The refrigeration module 200 comprises an external wall 204 which may serve as an external wall of the transport container 100 separating the internal environment of the container from the external atmosphere.

The example refrigeration module 200 comprises a refrigeration circuit including an evaporator 206 disposed on an inside of the external wall 204 and a condenser 208 disposed outside of the external wall 204. The refrigeration circuit may include a compressor, an expansion valve and flow lines connecting the components of the circuit as is known in the art so that in use the evaporator is configured to transfer heat from interior gas to the circulating refrigerant, and the condenser is configured to transfer heat from the refrigerant to exterior gas.

In this example an evaporator fan 210 is provided to direct a flow of return air 108 over the evaporator 206 to be cooled, and to then be directed to the cargo space as supply air 110. In this particular example, the refrigeration module is configured so that the return air flows downward through the refrigeration module, and the evaporator fan 210 is disposed upstream and therefore generally above the evaporator 206. However, in other examples the evaporator fan 210 may be disposed upstream or downstream relative the evaporator, and the particular orientation and direction of the flow therethrough may be different.

The refrigeration module further comprises a carbon dioxide removal apparatus 300 ("scrubber apparatus"), a gas sensor 224 for monitoring a parameter relating to the composition of interior gas, and a controller 226. As shown in FIG. 1, in this example the controller 226 is disposed outside of the external wall 204 of the refrigeration module, whereas the carbon dioxide removal apparatus 300 and the gas sensor 224 are disposed inside of the external wall 204.

In this particular example, the carbon dioxide removal apparatus 300 and the gas sensor 224 are disposed between the evaporator fan 210 and the evaporator 206 so that the evaporator fan 210 is configured to direct a flow of return air 108 towards the carbon dioxide removal apparatus and past the sensor 224. However, other relative positions may be adopted in other examples, and a flow of return air may be conveyed through the carbon dioxide removal apparatus by an integrated air mover of the apparatus 300 or by an air mover upstream or downstream of the apparatus.

As shown in FIG. 1, the refrigeration module 200 further comprises a fresh air vent 212 which is configured to selectively open and close to permit a flow of fresh air into the cargo space 105 as is known in the art.

In variants of the above example, additional apparatus for controlling the gas mixture in the controlled environment may be provided, whether as part of the refrigeration module 200 or another module to be installed in the container 100. Controlled atmosphere systems can generally be categorised as passive and active. Passive systems tend to rely on a constituent gas at elevated concentration being naturally adsorbed by a sorbent, or passing through a selectively-permeable membrane or molecular sieve. Active systems typically relate to systems that control the composition of an inlet stream of gas which replaces (i.e. flushes out) interior gas within the controlled environment to adjust the overall composition of the controlled environment. For example, some active systems use a compressor and a selectively permeable membrane or molecular sieve in order to create adjust the composition of an inlet flow of gas to provide a relatively reduced amount of oxygen and relatively increased amounts of one or more other component gases, such as nitrogen. It is envisaged that the scrubber apparatus described herein, whether or not it is incorporated in a refrigeration module of a transport refrigeration system or some other installation, can be used in conjunction with all manner of passive and active systems, fresh air vents and the like.

Figure 2:
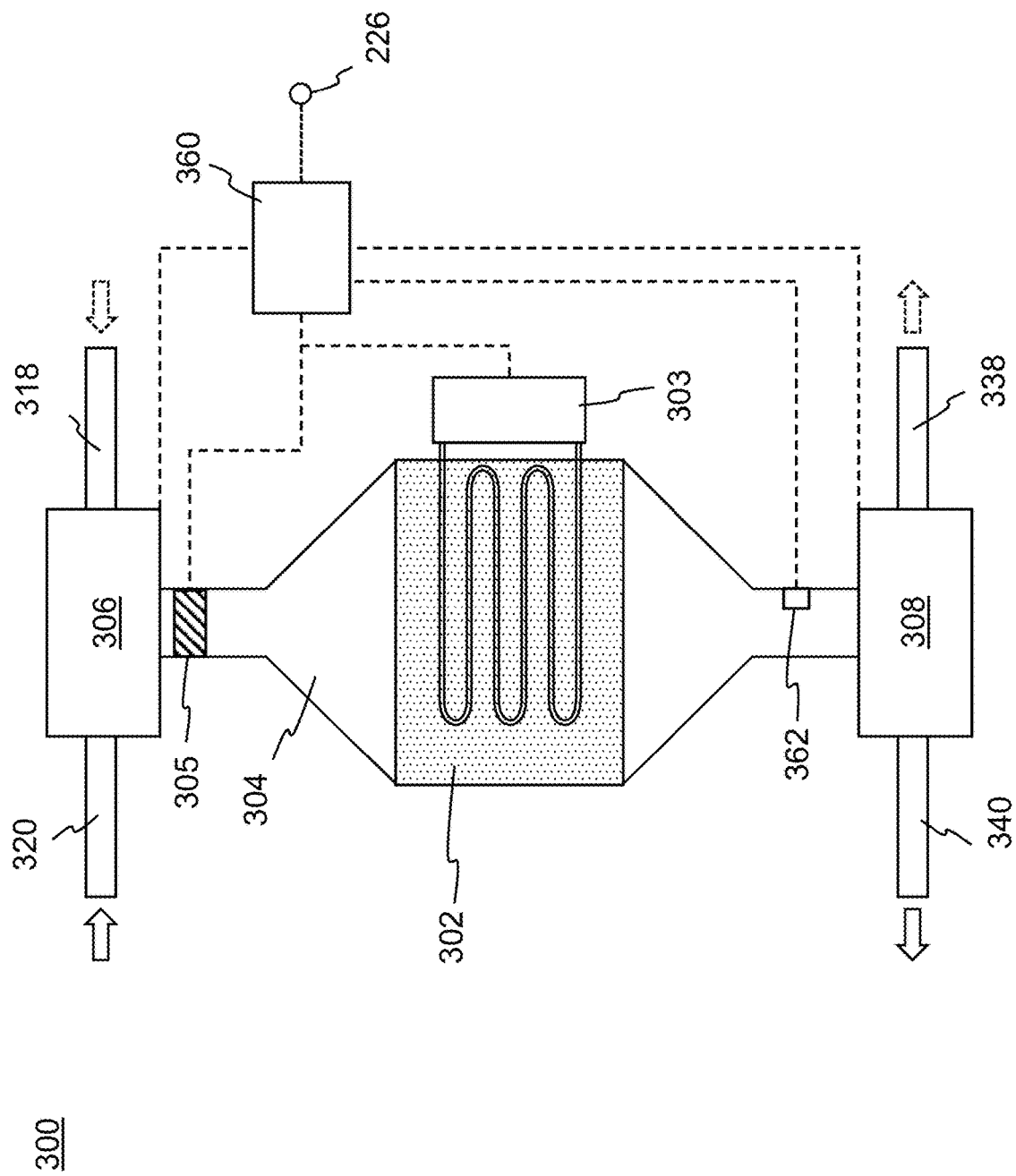
FIG. 2 is a simplified cross-sectional view of an example scrubber apparatus.

FIG. 2 shows an example configuration of the carbon dioxide removal apparatus 300, also referred to herein as a scrubber apparatus. In this example, the scrubber apparatus comprises a sorbent bed 302 comprising activated carbon. In this particular example, the sorbent bed 302 consists of activated carbon. In other examples, the sorbent bed may comprise predominantly activated carbon, for example it may be no less than 70 wt. % activated carbon, or no less than 80 wt. %, or no less than 90 wt. %, or no less than 95 wt. %, or no less than 99 wt. % of the sorbent bed is activated carbon.

The particular form in which the activated carbon is provided may be varied, such that the disclosure is equally applicable to sorbent beds which differ from one another in respect of the particle size, surface area to weight ratio, porosity and the like. An example of a suitable type of activated carbon is the pelletized activated carbon available from Silcarbon Aktivkohle GmbH of Germany, under the trade name Silcarbon SIL-40-3s, which has a 3 mm characteristic diameter.

In this example, the sorbent bed 302 is provided with a heater 303 which has a heating coil extending through the sorbent bed 302 for direct heating. In this particular example, the heater 303 is configured to transfer heat to the sorbent bed at a rate of up to 2 kW per kg of sorbent material, but in other examples may be configured to transfer a greater or lesser amount of heat energy. Other forms of heating are envisaged in the present disclosure, as will be briefly described below with respect to FIG. 3.

In this example, the sorbent bed 302 is provided within a duct 304 having inlet and outlet portions connected to an inlet switching manifold 306 and an outlet switching manifold 308 respectively. The inlet switching manifold 306 is configured to selectively provide gas to the inlet portion of the duct 304 from one of two ports: an inlet interior gas port 318 configured to receive a flow of interior gas from the controlled environment for removal of carbon dioxide at the sorbent bed; and an inlet exterior gas port 320 configured to receive a flow of regenerating gas (e.g. exterior gas such as ambient air) from outside of the controlled environment for desorption of carbon dioxide form the sorbent bed. The outlet switching manifold 308 is configured to selectively provide gas from the outlet portion of the duct 304 to one of two ports: an outlet interior gas port 338 configured to return the treated gas from the sorbent bed to the controlled environment, and an outlet exterior gas port 340 configured to discharge the $CO_2$-rich gas outside of the controlled environment. An air mover 305, such as a fan, is disposed within the duct 304 to controllably convey gas along the duct 304. In this example, the air mover 305 is provided upstream of the sorbent bed 302, but in other examples one or more air movers 305 may be provided in any suitable location for driving gas through the duct 304.

Each of the switching manifolds 306, 308 comprises a suitable arrangement of gas valves for switching between positions in which it exclusively fluidically connects the duct 304 with a respective one of the gas ports 318, 320, 338, 340.

The scrubber apparatus further comprises a controller 360 which in this example is operatively coupled to each of the switching manifolds 306, 308, to the heater 303, and to the air mover 305.

The switching manifolds 306, 308 together form a gas interchange mechanism configured to switch between an adsorption configuration and a regeneration configuration. In the adsorption configuration, the sorbent bed 302 is in fluid communication with a controlled environment inlet (i.e. the inlet interior gas port 318) to receive $CO_2$-rich gas from the controlled environment for adsorption, and the sorbent bed 302 is in fluid communication with a controlled environment outlet (i.e. the outlet interior gas port 338) to return treated gas to the controlled environment. Fluid communication with the inlet and outlet exterior gas ports 338, 340 is prevented. In the regeneration configuration, the sorbent bed 302 is in fluid communication with a regenerating gas inlet (i.e. the inlet exterior gas port 320) to receive regenerating gas from outside of the controlled environment for desorption and the sorbent bed, and the sorbent bed 302 is in fluid communication with an outside outlet (i.e. the outlet exterior gas port 340) to discharge $CO_2$-rich gas outside of the controlled environment. Fluid communication with the inlet and outlet interior gas ports 318, 320 is prevented.

The controller 360 is configured to control the gas interchange mechanism to switch between the adsorption configuration and the regeneration configuration. The controller 360 is further configured to cause the heater 303 to heat the sorbent bed 302 when in the regeneration configuration. The controller 360 is further configured to control the air mover 305, for example to turn it off and on. It may be operable to vary a speed of the air mover 305 and thereby a speed (or volumetric flow rate) of flow through the duct 304, as will be described below. In this example, the scrubber apparatus is configured for unidirectional flow through the sorbent bed 302 since there is an inlet manifold at one end and an outlet manifold at the other. However, it will be appreciated that the scrubber apparatus may have any suitable configuration, and may indeed be configured to pass gas through the sorbent bed in different directions when operating in the adsorption configuration and the regeneration configuration respectively.

In this example, the controller 360 is also configured to monitor a signal received from a temperature sensor 362 for monitoring an operating temperature of the scrubber apparatus 300. The temperature sensor 362 may be disposed in any suitable location depending on what quantity is to be measured and what form of control implemented, if any. It is envisaged that the heater 303 may be controlled by the controller 360 based on the operating temperature, for example to ensure that the operating temperature is within an operating range during operation in the regeneration configuration.

As is known in the art, a relevant factor in regeneration performance is the temperature of the sorbent bed (i.e. the temperature of the sorbent material within the bed). Since the regenerating gas passes through the sorbent bed, the temperature of the gas as it is discharged from the sorbent bed may be equal to, or at least a function of, a temperature of the sorbent bed (for example an average temperature of the sorbent material within the sorbent bed).

In this example an operating temperature corresponding to the temperature of the sorbent bed is monitored, in particular by providing the temperature sensor 362 within the duct 304 downstream of the sorbent bed. In other examples, one or more temperature sensors may be located in other locations for monitoring the temperature of the sorbent bed, for example one or more may be distributed within the sorbent bed 302 to enable estimation of an average temperature of the sorbent bed.

As shown in FIG. 2, the controller 360 of the scrubber apparatus 300 is operatively coupled to the controller 226 of the refrigeration module 200, such that the controller 226 of the refrigeration module 200 may instruct the controller 360 of the scrubber apparatus 300 to vary its mode of operation, as will be described in further detail below.

Figure 3:
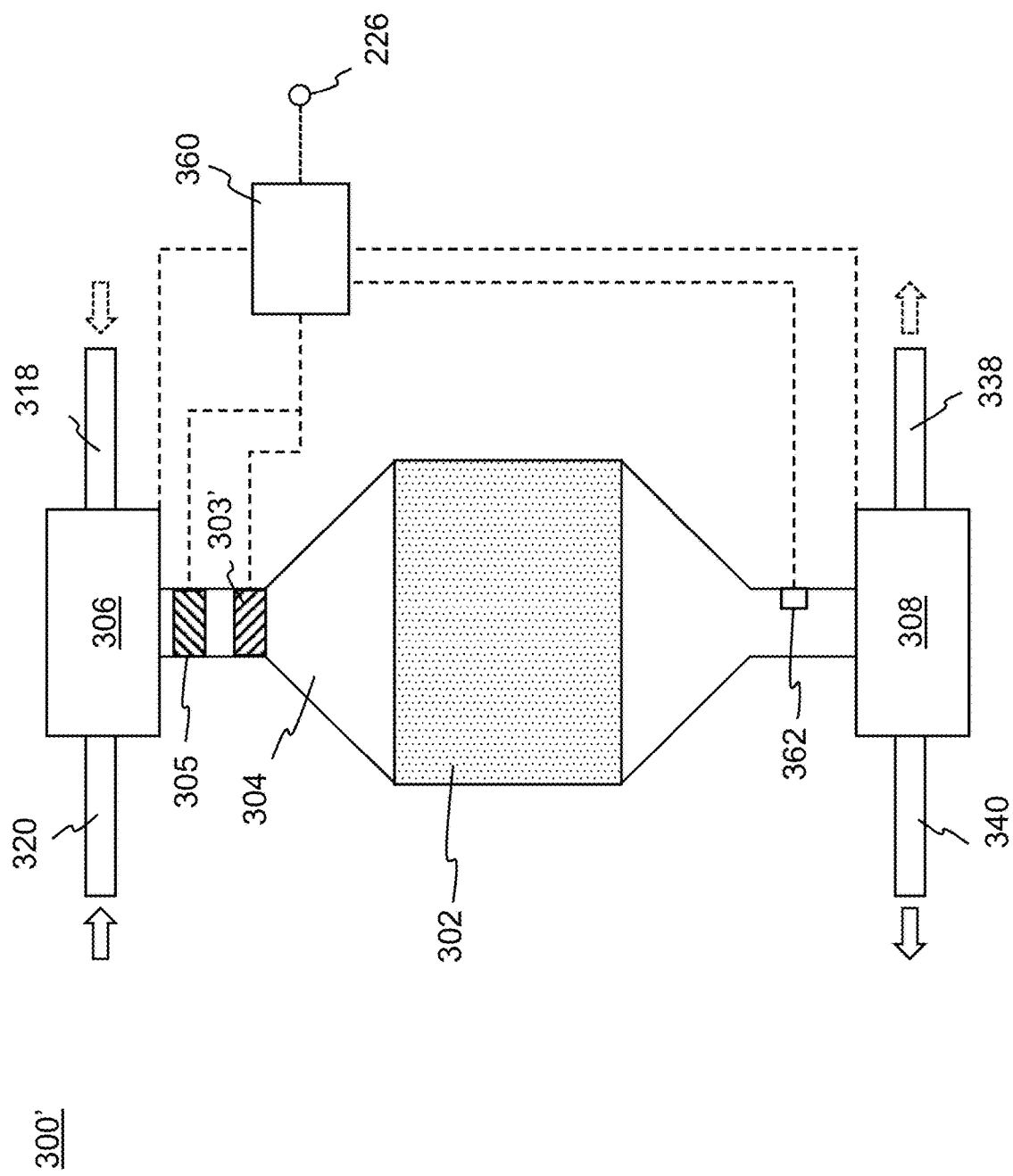
FIG. 3 is a simplified cross-sectional view of a further example scrubber apparatus.

Briefly, FIG. 3 shows a scrubber apparatus 300' having a similar configuration to the scrubber apparatus 300 described above with respect to FIG. 2, differing only in the form and arrangement of the heater. In this example, a heater 303' is provided upstream of the sorbent bed 302 in order to heat the flow of gas provided to the sorbent bed 302 in the regeneration configuration. Accordingly, in this embodiment the sorbent bed 302 is indirectly heated, by virtue of heating the gas which then heats the sorbent bed. The following description is equally applicable to the scrubber apparatuses 300, 300' of FIGS. 2 and 3. For brevity in the following description, reference may be made to "the scrubber apparatus 300", but should be considered equally applicable to either example.

Before discussing operation of the scrubber apparatus 300 and the related advantages, the state of the art with respect to the use of activated carbon for $CO_2$ removal is noted as follows.

While activated carbon is a known adsorbent material used for adsorbing $CO_2$, it has not been considered a practical option for a regenerative adsorption system for controlled atmosphere.

In particular, published technical information from activated carbon manufacturers indicate that activated carbon has a low adsorption efficiency (about 3% by weight—i.e. an amount of carbon dioxide equal to 3% of the weight of the activated carbon). Further, such published technical information indicates that activated carbon is to be regenerated at high temperatures, for example 250° C. and above. Yet further, such published technical information indicates that, for $CO_2$ removal applications, a type of activated carbon known as impregnated activated carbon should be used (i.e. impregnated with additional chemicals to enhance the adsorption of particular gases and molecules). However, such impregnated activated carbon is understood to be single-use, and not suitable for regeneration.

Examples of such technical information on activated carbon has been published by Cabot Corporation, USA. An information sheet on reactivation services for activated carbon indicates thermal reactivation temperatures of over 900° C. A copy of the information sheet published before the priority date of the present application is available on "the Internet Archive" (the "Wayback Machine") at: web.archive.org/web/20200421162405/https:/www.cabotcorp.com/solutions/products-plus/activated-carbon/reactivation-services A further example of such technical information has been published by TROX KS Filter a.s. of Czech Republic, with reference to an activated carbon reactivation process at temperatures up to 830° for 30 minutes. The reactivation process is described as having considerable quality advantages as compared to other technologies, with specific reference to such other technologies as thermal desorption in the range 250°-350° C., and stating that lower temperatures do not result in restoration of the activated surface. A copy of the technical information as published before the priority date of the present application is available on "the Internet Archive" (the "Wayback Machine") at: web.archive.org/web/20200421162554/https:/www.ksklimaservice.cz/en/reactivation-of-activated-carbon-servicing-and-disposal-of-filters Further, the entry for activated carbon on the public encyclopedia Wikipedia states that the most common regeneration technique employed in industrial processes is thermal reactivation, generally following three steps including (i) adsorbent drying at approximately 105° C.; (ii) high temperature desorption and decomposition (500-900° C.) under an inert atmosphere; and (iii) residual organic gasification by a non-oxidising gas (steam or carbon dioxide) at elevated temperatures (800° C.). A copy of the information disclosed in the encyclopedia before the priority date of the present application is available on "the Internet Archive" (the "Wayback Machine") at: web.archive.org/web/20200421162750/https://en.wikipedia.org/wiki/Activated_carbon Accordingly, activated carbon is typically only found in practical controlled atmosphere systems for purposes other than $CO_2$ removal, such as to remove volatile organic compounds (VOCs) or other gases and particles for which it has better removal performance, for which the published literature suggests relatively higher removal efficiencies of activated carbon. While it has previously been proposed to use activated carbon in regenerative scrubbers for $CO_2$ removal, such proposals envisage continuous use in an adsorption mode until $CO_2$ is below a threshold, before switching to a regenerative mode. In view of the low adsorption efficiency of activated carbon, it is thought that such proposals, if implemented in practice, would require a relatively large sorbent bed in order to provide sufficient $CO_2$ removal capability.

Nevertheless, the inventors have surprisingly found that activated carbon can be used for efficient removal of carbon dioxide if the scrubber apparatus is operated alternately between the adsorption configuration and the regeneration configuration, at a relatively fast cycle rate. This enables the size of an activated carbon sorbent bed to be reduced, and opens up the use of activated carbon as a practical option for $CO_2$ removal.

Some terminology used in the following description includes the terms "cycle", "cycle frequency", and "cycle ratio". A cycle comprises a single period of operating the scrubber apparatus in the adsorption configuration and a single period of operating the scrubber apparatus in the regeneration configuration. The term "cycle frequency" relates to the number of cycles within a period of time, with cycle frequency being defined in units of cycles/hour in the present disclosure. The term "cycle ratio" relates to the ratio of the period of time in the adsorption configuration and the period of time in the regeneration configuration, for each cycle.

The inventors have surprisingly found that by operating the scrubber apparatus in short cycles, a $CO_2$ removal efficiency per cycle is reduced (as expected), but the overall $CO_2$ removal efficiency per unit time can be improved. In particular, it is thought that the activated carbon sorbent has a relatively high initial rate of adsorbing carbon dioxide which quickly reduces.

The inventors have surprisingly found that a sorbent bed comprising activated carbon can in fact be regenerated sufficiently well at relatively low temperatures and during relatively short regeneration periods, so as to repeatedly provide a relatively high initial rate of adsorption (as is available after regeneration). This is said to be surprising since conventional thinking with respect to activated carbon is that it is to be regenerated at relatively high temperatures, a process which is clearly not practical for repeatedly regenerating within a short time frame (i.e. at a relatively high cycle frequency). This is at least because it is conventionally thought that adsorption occurs at relatively low temperatures (known as Le-Chatelier's principle), whereas regeneration occurs at relatively high temperatures (e.g. above 250° C., as discussed above), such that there is an inherent practical difficulty in terms of heating and cooling to switch between those operating conditions over short periods, and of course there would be a high energy cost associated with doing so.

The inventors have performed tests showing that, with only moderate heating during the regeneration condition, sufficient regeneration occurs over a relatively short regeneration period, such that a scrubber apparatus can be operated at a relatively high frequency to repeatedly access the relatively high initial rate of carbon dioxide adsorption. In particular, the inventors have found that sufficient regeneration occurs even when the sorbent bed is heated to no more than 30° C., albeit there is improved performance at higher temperature, for example up to 40° C., up to 50° or up to 75° C.

The inventors tested $CO_2$ removal while varying a number of factors, including:
the cycle frequency; and
the cycle ratio.

Figure 4:
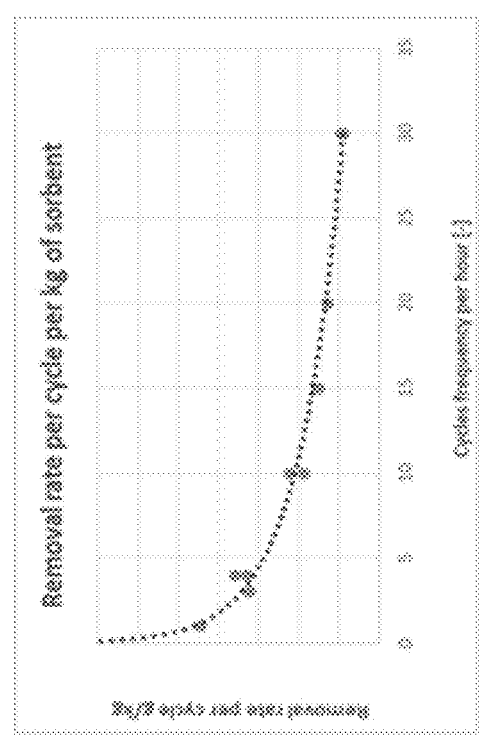

FIG. 4 is a plot showing carbon dioxide removal per cycle against cycle frequency. As can be seen, the amount of carbon dioxide removal per cycle generally decreases as the cycle frequency (e.g. per hour) increases.

Figure 5:
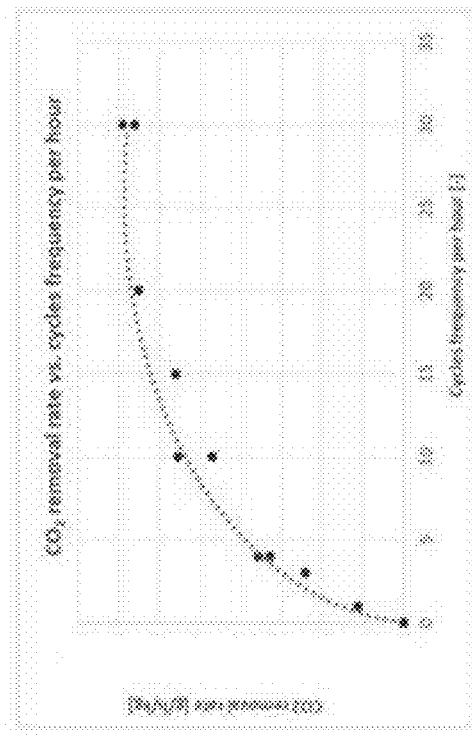

Nevertheless, the inventors have found that, with a suitable cycle ratio, the carbon dioxide removal rate per unit time actually increases with cycle frequency, as shown in FIG. 5, which plots removal rate (in grams/kg sorbent/hour) against cycle frequency. Having analysed the data and with the benefit of hindsight, it is thought that, in a range of frequency cycles, a beneficial effect of more frequently returning to a relatively high initial relate of adsorption outweighs the disadvantages of adsorbing less carbon dioxide per cycle and the need to more frequently regenerate the activated carbon. FIG. 5 indicates that the incremental benefits of further increasing the cycle frequency diminish with increasing cycle frequency such that there would be an optimal cycle frequency for a peak removal rate. FIG. 5 shows a particularly advantageous range of between 4 and 30 cycles per hour. An advantageous range may extend to a higher cycle frequency, for example up to 50 cycles per hour, dependent on the operating conditions and configuration.

This trend was observed while testing at a range of cycle ratios which were thought to be reasonable (i.e. ratios of between 5:1 and 1:1, adsorption:regeneration).

Nevertheless, the inventors have reasoned that for any given cycle frequency, there would be an optimum cycle ratio. In particular, if the limit conditions of high and low cycle ratios are considered, it is clear that a very high cycle ratio would offer no improvement over long-term operation solely in the adsorption configuration, since there would be insufficient time spent in the regeneration configuration to usefully regenerate the activated carbon. In contrast, it is clear that a very low cycle ratio would mean that the activated carbon may be well regenerated, but insufficient time is allocated to actually conduct adsorption in an efficient manner.

Therefore, the inventors have determined that the cycle ratio can be optimised to find, for a given cycle frequency, the cycle ratio that affords the highest amount of carbon dioxide removal per unit time (i.e. over multiple successive cycles). Testing has indeed shown that, for the same cycle frequency, two different cycle ratios can achieve the same $CO_2$ removal rate per unit time, and it is thought that two such cycle ratios would lie either side of the optimum cycle ratio at that cycle frequency, and that a plot of removal rate (by unit time) against cycle ratio may be in the shape of a bell curve.

Since the heater is active during operation in the regeneration configuration, energy consumption is effectively proportional to the amount of time spent in the regeneration configuration, and therefore is largely a function of cycle ratio and independent of cycle frequency (particularly if heating is applied at a constant rate). Total energy consumption is nevertheless affected by cycle frequency to some extent owing to the energy consumed in operating the gas interchange mechanism to move between the adsorption and regeneration configurations.

The inventors have found that, when designing a practical implementation of a scrubber apparatus, $CO_2$ removal rate is one factor of many to consider. It is thought that a high cycle frequency would fatigue the scrubber apparatus itself, since high frequency operation of any means for switching between an adsorption configuration and a regeneration configuration may lead to early component failures. Accordingly, from a component resilience and system reliability perspective, a lower cycle frequency is advantageous.

Further, acknowledging that each regeneration period commences with a transition period in which the temperature gradually rises towards a temperature for efficient regeneration, it is thought that higher cycle frequencies tend to involve more cumulative time spent in a transition period. Consequently, it is thought that the optimal cycle ratio tends to reduce (i.e. more time spent in the regeneration configuration) with increasing cycle frequency.

Accordingly, the inventors have determined that, while higher cycle rates tend to provide better $CO_2$ removal rates (to a point), a higher cycle rate is associated with reduced component lifetime (or alternatively higher manufacturing cost for resilience) and higher energy consumption.

Figure 6:
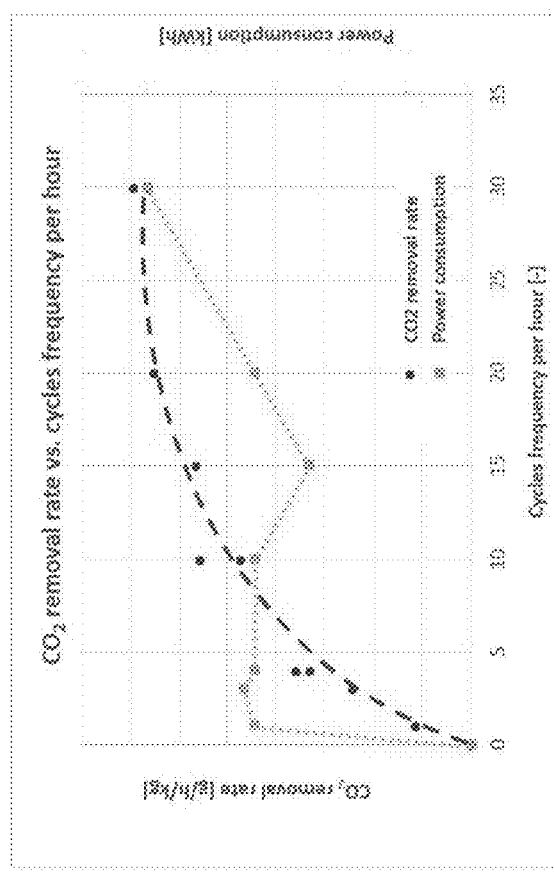
FIGS. 4-6 are plots from tests of carbon dioxide removal at various frequencies of cyclical scrubber operation.

FIG. 6 is a dual-axis plot of $CO_2$ removal rate per unit time, and energy consumption, against cycle frequency. This shows once again the trend of increasing removal rate with cycle frequency, but also shows that a practical choice of cycle ratio (i.e. one thought to be near the optimum for operation at that cycle frequency) tends to increase towards the higher range of cycle frequencies.

A particularly good balance of $CO_2$ removal efficiency, component wear/reliability, and energy consumption is to be gained by selecting a moderate cycle frequency, where advantages associated with the improved $CO_2$ removal performance (per unit time) have been achieved to an extent but are diminishing. For example, considering the data presented in FIGS. 4-6, a particularly suitable frequency from the range tested (1-30 cycles per hour) would be in the region of 15 cycles per hour.

It will be appreciated that the particular frequency that may be chosen will depend on numerous factors. For example, the various trade-offs may be impacted by the power rating of a heater (with lower-powered heaters naturally taking longer to heat the sorbent bed to a target temperature), the temperature of the gas received from the controlled environment, its $CO_2$ concentration, humidity and other factors. Nevertheless, the data provided in FIGS. 4-6 demonstrates that cyclical operation is advantageous in principle, and that operation in the range 4-30 cycles per hour offers significant advantages over continuous operation in the adsorption configuration as is conventional in the art (i.e. with regeneration only occurring after a $CO_2$ removal target is reached and adsorption stopped). The range 10-20 cycles per hour may be considered particularly advantageous for the reasons set out above.

The inventors have found that it can be advantageous to modulate the velocity of gas flow through the sorbent bed dependent on whether the scrubber apparatus is operating in the adsorption configuration or the regeneration configuration. Without wishing to be bound by theory, it is thought that a relatively lower velocity during adsorption improves adsorption performance, as the residency time of molecules in the sorbent bed is greater, and there is less inertia such that carbon dioxide molecules may more easily settle and be retained on the sorbent. In contrast, in regeneration it is thought that a higher velocity of the regenerating gas may provide increased energy to help entrain carbon dioxide molecules. Further, when the heater heats the regenerating gas in order to heat the sorbent bed, a higher velocity promotes heat transfer to the sorbent bed. For example, testing has shown improved cycle efficiencies (i.e. carbon dioxide removal rate per hour) in conditions where the average velocity through the sorbent bed is less than 0.5 m/s during adsorption, and greater than 0.5 m/s during regeneration. Optimal flow velocities for each configuration are thought to depend on the specific configuration of the sorbent bed and any cartridge in which it is provided.

Figure 7:
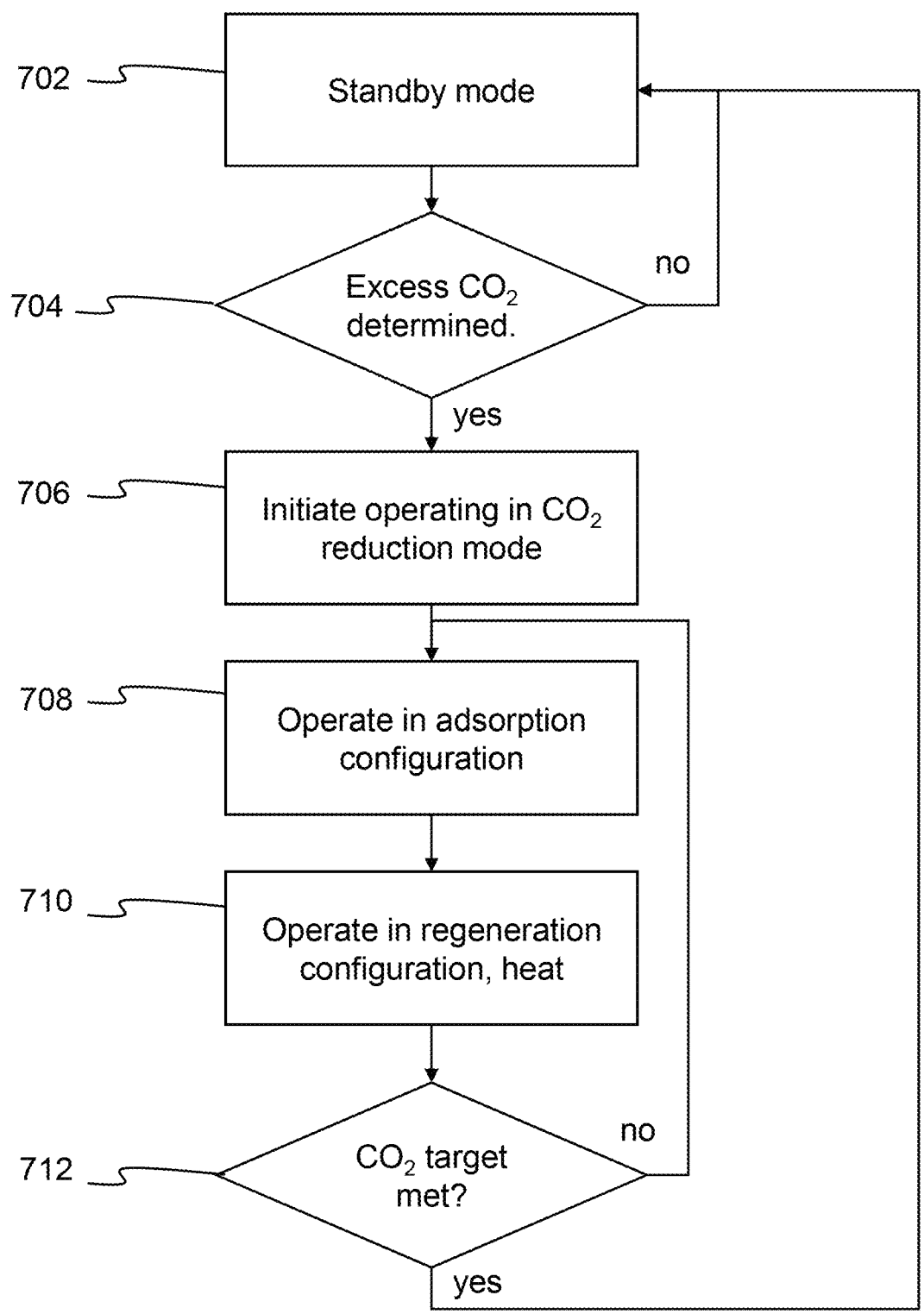
FIG. 7 is a flowchart of an example method of operating a scrubber apparatus.

Having discussed the principles of the high frequency operation above, the following description relates to an example of operating the scrubber apparatus 300 as described above, as part of the refrigeration module 200 as described above, with further reference to the flow chart of FIG. 7.

The example method 700 of FIG. 7 relates to a method in which the scrubber apparatus is controlled to operate in either a $CO_2$ reduction mode, or to be in a standby mode. In the $CO_2$ reduction mode, $CO_2$ is removed from the controlled environment at a relatively high rate to effect an overall reduction in the $CO_2$ level (i.e. concentration) in the controlled environment, whereas in the standby mode the $CO_2$ level in the controlled environment may be within an acceptable target range, such that the scrubber apparatus is either deactivated or operated at a relatively lower $CO_2$ removal rate. It may be that operation at a relatively lower $CO_2$ removal rate does not cause an overall reduction in the $CO_2$ level in the controlled environment, for example if cargo (such as fruit and vegetable produce) respires to generate $CO_2$ at a relatively higher rate. As will be described below, other methods of operating the scrubber apparatus are envisaged within this disclosure.

In block 702 (FIG. 7), the controller 360 of the scrubber apparatus is operating in a standby mode, as instructed by the controller 226 of the refrigeration module 200 which monitors $CO_2$ level using the sensor 224. In this particular example, when in the standby mode, the gas interchange mechanism (provided by the manifolds 306, 308) is in the regeneration configuration, the heater 303 is deactivated, and the air mover 305 is deactivated. Consequently, in the standby mode the scrubber apparatus 300 effectively consumes no power, but remains open to receive regenerating gas for passive regeneration at low temperature. In other examples, operation in the standby mode may differ, as will be discussed in further detail towards the end of the specification.

In block 704, the controller 226 of the refrigeration module 200 determines a requirement that $CO_2$ level in the controlled environment is to be reduced, for example having determined that the $CO_2$ level has exceeded a threshold. For example, the controller 226 may monitor $CO_2$ level in the controlled environment in order to maintain it within a target range, or to target a set point concentration. In other examples, it may be the controller 360 of the scrubber apparatus which performs such control, and which may be coupled to a sensor (e.g. the sensor 224) for monitoring $CO_2$ level in the controlled environment.

In block 706, responsive to determining that the $CO_2$ level is to be reduced, the controller 226 instructs the controller 360 of the scrubber apparatus to operate in the $CO_2$ reduction mode until the $CO_2$ level is reduced to a target, or below it. A threshold $CO_2$ level at which the $CO_2$ reduction mode is initiated may be higher than the target $CO_2$ level, such that in use the $CO_2$ level is allowed to gradually rise before being periodically reduced. Such a control method may reduce the amount of time in which the scrubber apparatus is required to operate in the $CO_2$ reduction mode, while still permitting relatively good control to maintain the $CO_2$ level within a target range. As above, in other examples, it may be the controller 360 of the scrubber apparatus which determines to initiate the $CO_2$ reduction mode.

In blocks 708 and 710, the controller 360 alternately operates the scrubber apparatus in the adsorption configuration (block 708) and the regeneration configuration (block 710), while controlling the heater 303 to heat the sorbent bed 302 in the regeneration configuration, throughout a plurality of cycles, until the $CO_2$ target is determined to be met (block 712).

In this particular example, the controller 360 causes the scrubber apparatus to operate at a cycle frequency of 15 cycles per hour, and at a cycle ratio of 3:1. This corresponds to 3 minutes of operation in the adsorption configuration, followed by 1 minute of operation in the regeneration configuration.

The controller 360 causes the air mover 305 to operate at a higher speed in the regeneration configuration than in the adsorption configuration, such that a volumetric flow rate of gas through the sorbent bed 302 is higher during operation in the regeneration configuration than during operation in the adsorption configuration (e.g. 50% higher). In other examples, the speed may be equal between the two configurations.

The scrubber apparatus is configured so that the sorbent bed 302 is exposed to the respective gas flows (i.e. gas from the controlled environment and from outside of the controlled environment, dependent on the configuration) at substantially the same total pressure (sum of static and dynamic pressures) as at the source location of the respective gases. For example, when the regenerating gas is ambient air sourced from outside of the controlled environment, the scrubber apparatus is configured to provide it to the sorbent bed substantially at atmospheric pressure. Any increase in total pressure owing to operation of the air mover 205 may be minimal, such as 5-50 Pa, so as to permit it to be driven through the sorbent bed. Similarly, the scrubber apparatus is configured to provide gas from the controlled environment to the sorbent bed substantially at the same pressure as the controlled environment within the cargo space, with any increase in total pressure due to operation of the air mover 205 being minimal, such as 5-50 Pa. In other words, the scrubber apparatus 300 is operated so that the air mover 205 drives the respective gas flows through the sorbent bed 302 with a minimal pressure drop across the sorbent bed, for example a pressure drop of no more than 100 Pa, for example no more than 50 Pa.

In this particular example, the heater 303 is controlled to apply heat at its maximum rated power of 2 kW/kg of sorbent material throughout the regeneration configuration, such that the temperature of the sorbent material increases during operation in the regeneration configuration. Heaters with a greater or lower specific power may be used. In some examples, a heater may initially be operated at a high power in order to bring the sorbent bed up to a target temperature, and then the power may be reduced upon reaching the target temperature. The heater may be controlled using the monitored operating temperature (as described above) to provide feedback.

In this example, the sorbent material reaches a maximum average temperature of approximately 30° C. during operation in the regeneration configuration in each cycle. Similarly, the regenerating gas is either heated to a maximum discharge temperature of approximately 30° C. as it passes through a directly-heated sorbent bed (FIG. 2), or transfers heats to the sorbent bed (FIG. 3) such that it leaves with a maximum discharge temperature of approximately 30° C. In other examples these temperatures may be higher or lower. The inventors consider that a suitable maximum temperature (e.g. either the maximum average temperature of the sorbent bed, or of the regenerating gas as it is discharged having passed through it) which permits sufficient regeneration while minimising energy consumption is no more than 75° C., for example no more than 50° C., no more than 40° C., or no more than 30° C.; and no less than 15° C., for example no less than 20° C. A controller may be configured to ensure that the temperature reaches a value within a range defined between any permutation of those limits, and equally the disclosure envisages method of operation in which the temperature lies within a range defined between any permutation of those limits.

Once the controller 226 determines that the $CO_2$ target is met, the controller 226 instructs the controller 360 of the scrubber apparatus 300 to return to the standby mode (block 712). As above, such control may be performed by the controller 360 of the scrubber apparatus 300 itself.

It is envisaged that periods of operation in the $CO_2$ reduction mode extend over a plurality of cycles. For example, the scrubber apparatus may be operated in the $CO_2$ reduction mode for at least 5 cycles, at least 10 cycles, or at least 20 cycles, before the $CO_2$ reduction mode is ended. The controller 360 may be configured to operate in the $CO_2$ reduction mode with a predetermined minimum number of cycles (e.g. at least 5 cycles, at least 10 cycles or at least 20 cycles). Consequently, unlike conventional modes of operating a regenerating scrubber, the scrubber apparatus is alternately operated in the adsorption configuration and the regeneration configuration while continually seeking to reduce the overall $CO_2$ level in the controlled environment.

As discussed above, other modes of operation are envisaged in the disclosure. In a variant of the above example, the scrubber apparatus may cyclically operate (i.e. alternating between the adsorption and regeneration configurations) in the standby mode, but in such a way as to achieve a relatively lower $CO_2$ removal rate per unit time and optionally at a lower power consumption. For example, operating parameters of the scrubber apparatus may be adjusted such as (i) increasing the cycle ratio (thereby reducing the proportion of time spent in the regenerating configuration with the heater on); (ii) lowering the heater power, or deactivating it; and/or (iii) reducing the speed of the air mover 305, or deactivating it.

Further, in some examples the scrubber apparatus may be operated continuously in a cyclical mode of operation, rather than operation progressing between a $CO_2$ reduction mode and a standby mode. For example, the scrubber apparatus may be controlled to achieve a variable rate of $CO_2$ removal by adjusting one or more control parameters, such as one or more control parameters selected from the group consisting of:
- an operating parameter of the air mover, such as a power provided to the air mover during adsorption and/or regeneration, or a rotary speed of the fan during adsorption and/or regeneration;
- the cycle ratio;
- the cycle frequency;
- an operating parameter of the heater, such as a heater power, or a target operating temperature as described elsewhere herein.

A variable rate of $CO_2$ removal may be demanded responsive to monitoring of a variable $CO_2$ level within the controlled environment. For example, a controller (e.g. of the refrigeration module or of the scrubber apparatus) may monitor a respiration rate of the cargo and demand a variable rate of $CO_2$ removal accordingly, or may demand a variable rate of $CO_2$ removal in accordance with any suitable control strategy for controlling the $CO_2$ level within the controlled environment.

As described above, it may be that the scrubber apparatus is operated at a cycle ratio which is higher than a theoretical optimum cycle ratio (for $CO_2$ removal rate) for a selected cycle frequency, in order to reduce power consumption. However, a controller may be configured to switch from such a non-optimal cycle ratio to a relatively lower cycle ratio (e.g. closer to or at the optimal cycle ratio) upon a determination being made (e.g. by the controller or another controller of the respective installation) that shore power (i.e. mains power) is available, as opposed to a local source of power (such as a generator or battery).

The invention claimed is:

1. A method of operating an activated carbon scrubber apparatus for carbon dioxide ($CO_2$) removal from a controlled environment;
    wherein the scrubber apparatus is configured to switch between:
        an adsorption configuration in which the scrubber apparatus is configured to provide $CO_2$-rich gas from the controlled environment to a sorbent bed comprising activated carbon for $CO_2$ adsorption, and to return the treated gas to the controlled environment;
        a regeneration configuration in which the scrubber apparatus is configured to provide a regenerating gas from outside of the controlled environment to the sorbent bed to desorb $CO_2$ and regenerate the activated carbon, and to discharge $CO_2$-rich gas outside of the controlled environment;
    the method comprising:
    alternately operating the scrubber apparatus in the adsorption configuration and the regeneration configuration over a plurality of cycles, each cycle comprising a single period in the adsorption configuration and a single period in the regeneration configuration;
    wherein the scrubber apparatus is operated at a cycle frequency of between 4 and 30 cycles per hour;
    controlling a heater to heat the sorbent bed in the regeneration configuration.

2. A method according to claim 1, wherein the cycle frequency is between 10 and 20 cycles per hour.

3. A method according to claim 1, wherein for each cycle, the scrubber apparatus is operated at a cycle ratio, defined as a ratio between the period in the adsorption configuration and the period in the regeneration configuration, of between 1:1 and 5:1.

4. A method according to claim 1, wherein during each cycle, the sorbent bed is heated to a maximum average temperature of no more than 75° C.

5. A method according to claim 1, wherein during each cycle, the heating is such that the discharged $CO_2$-rich gas has a maximum temperature as it is discharged from the sorbent bed of no more than 75° C.

6. A method according to claim 1, wherein during each cycle, the heating is such that the discharged $CO_2$-rich gas has a maximum temperature as it is discharged from the sorbent bed of no less than 15° C.

7. A method according to claim 1, wherein the heater is controlled to transfer heat to the sorbent bed during the regeneration configuration at a maximum specific heat transfer rate, relative to the weight of sorbent material in the sorbent bed, of no more than 5kW/kg.

8. A method according to claim 7, wherein the scrubber apparatus is operated so that a volumetric flow rate of gas through the sorbent bed is higher during operation in the regeneration configuration than during operation in the adsorption configuration.

9. A method according to claim 8, wherein the volumetric flow rate is at least 50% greater during operation in the regeneration configuration than during operation in the adsorption configuration.

10. A method according to claim 1, wherein the scrubber apparatus is installed in a controlled atmosphere system.

11. A method according to claim 10, wherein the controlled atmosphere system is operated to regulate a level of carbon dioxide within a controlled environment;
  wherein the regulation comprises determining a requirement to reduce the level of carbon dioxide to a threshold or below;
  wherein, responsive to determining the requirement to reduce the level of carbon dioxide, the scrubber apparatus is operated in a $CO_2$ reduction mode to remove carbon dioxide from the controlled environment until the carbon dioxide is reduced to the threshold or below; and
  wherein the scrubber apparatus is alternately operated in the adsorption configuration and the regeneration configuration during operation in the $CO_2$ reduction mode.

12. A scrubber apparatus for removing carbon dioxide from a controlled environment, the scrubber apparatus comprising:
  a sorbent bed comprising activated carbon for $CO_2$ adsorption;
  a gas interchange mechanism configured to switch between:
    an adsorption configuration in which the sorbent bed is in fluid communication with a controlled environment inlet to receive $CO_2$-rich gas from a controlled environment for adsorption, and in which the sorbent bed is in fluid communication with a controlled environment outlet to return treated gas to the controlled environment;
    a regeneration configuration in which the sorbent bed is in fluid communication with a regenerating gas inlet to receive regenerating gas from outside of the controlled environment for desorption, and in which the sorbent bed is in fluid communication with an outside outlet to discharge $CO_2$-rich gas outside of the controlled environment;
  a heater configured to heat the sorbent bed in the regeneration configuration;
  a controller configured to cause the scrubber apparatus to alternately operate in the adsorption configuration and the regeneration configuration over a plurality of cycles, each cycle comprising a single period in the adsorption configuration and a single period in the regeneration configuration;
  wherein the controller is configured to cause the scrubber apparatus to be operated at a cycle frequency of between 4 and 30 cycles per hour;
  wherein the controller is configured to control the heater to heat the sorbent bed in the regeneration configuration.

13. A scrubber apparatus according to claim 12, comprising one or more air movers for directing gas through the sorbent bed, wherein the controller is configured to control the one or more air movers so that a volumetric flow rate of gas through the sorbent bed is higher during operation in the regeneration configuration than during operation in the adsorption configuration.

14. A scrubber apparatus according to claim 13, wherein the volumetric flow rate is at least 50% greater during operation in the regeneration configuration than during operation in the adsorption configuration.

15. A scrubber apparatus according to claim 12, wherein the heater has a maximum specific heat transfer rate for heating the sorbent bed, relative to the weight of sorbent material in the sorbent bed, of no more than 5 kW/kg.

16. A scrubber apparatus according to claim 12, wherein the controller is configured to operate the scrubber apparatus at a cycle ratio, defined as a ratio between the period in the adsorption configuration and the period in the regeneration configuration, of between 1:1 and 5:1.

17. A controlled atmosphere system, comprising a scrubber apparatus, the scrubber apparatus comprising:
  a sorbent bed comprising activated carbon for $CO_2$ adsorption;
  a gas interchange mechanism configured to switch between:
    an adsorption configuration in which the sorbent bed is in fluid communication with a controlled environment inlet to receive $CO_2$-rich gas from a controlled environment for adsorption, and in which the sorbent bed is in fluid communication with a controlled environment outlet to return treated gas to the controlled environment;
    a regeneration configuration in which the sorbent bed is in fluid communication with a regenerating gas inlet to receive regenerating gas from outside of the controlled environment for desorption, and in which the sorbent bed is in fluid communication with an outside outlet to discharge $CO_2$-rich gas outside of the controlled environment;
  a heater configured to heat the sorbent bed in the regeneration configuration;
  a controller configured to cause the scrubber apparatus to alternately operate in the adsorption configuration and the regeneration configuration over a plurality of cycles, each cycle comprising a single period in the adsorption configuration and a single period in the regeneration configuration;
  wherein the controller is configured to cause the scrubber apparatus to be operated at a cycle frequency of between 4 and 30 m cycles per hour;
  wherein the controller is configured to control the heater to heat the sorbent bed in the regeneration configuration.

18. A controlled atmosphere system according to claim 17, wherein the controlled atmosphere system is configured to regulate a level of carbon dioxide within a controlled environment, and is configured to determine a requirement to reduce the level of carbon dioxide to a threshold or below;
  wherein the controlled atmosphere system is configured to operate the scrubber apparatus in a $CO_2$ reduction mode responsive to determining the requirement to reduce the level of carbon dioxide; and
  wherein the scrubber apparatus is configured to operate alternately in the adsorption configuration and the regeneration configuration during operation in the $CO_2$ reduction mode.

19. A method according to claim 10, wherein the controlled atmosphere system is a transport refrigeration system for use in a shipping container, trailer or truck.

20. A controlled atmosphere system according to claim 17, wherein the controlled atmosphere system is a transport refrigeration system.

* * * * *